June 6, 1939.  C. PEZZOLO  2,161,428
AGRICULTURAL DIGGING MACHINE
Filed Oct. 8, 1936  4 Sheets-Sheet 3
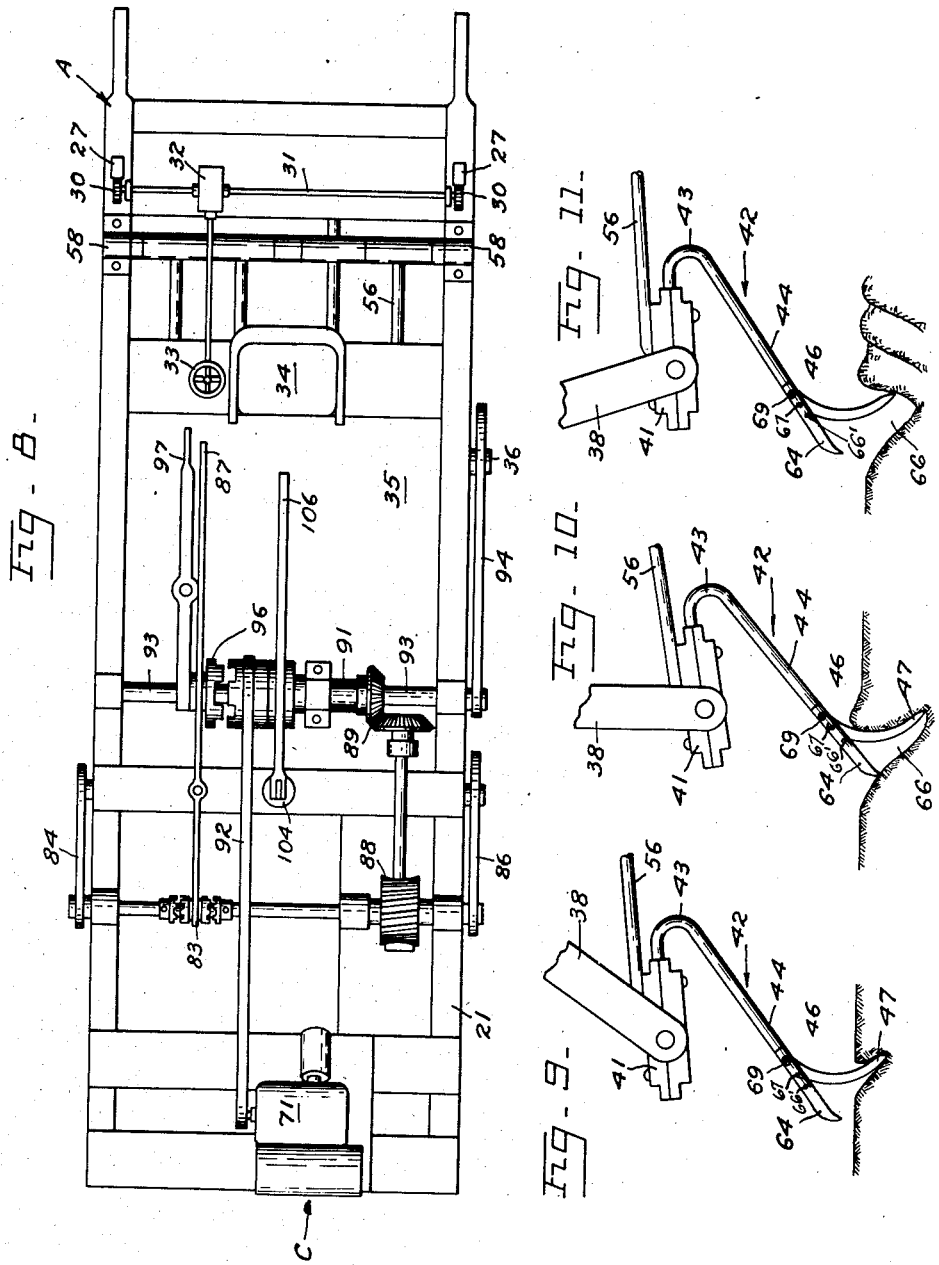
INVENTOR.
CAESAR PEZZOLO
BY George B. White
ATTORNEY.

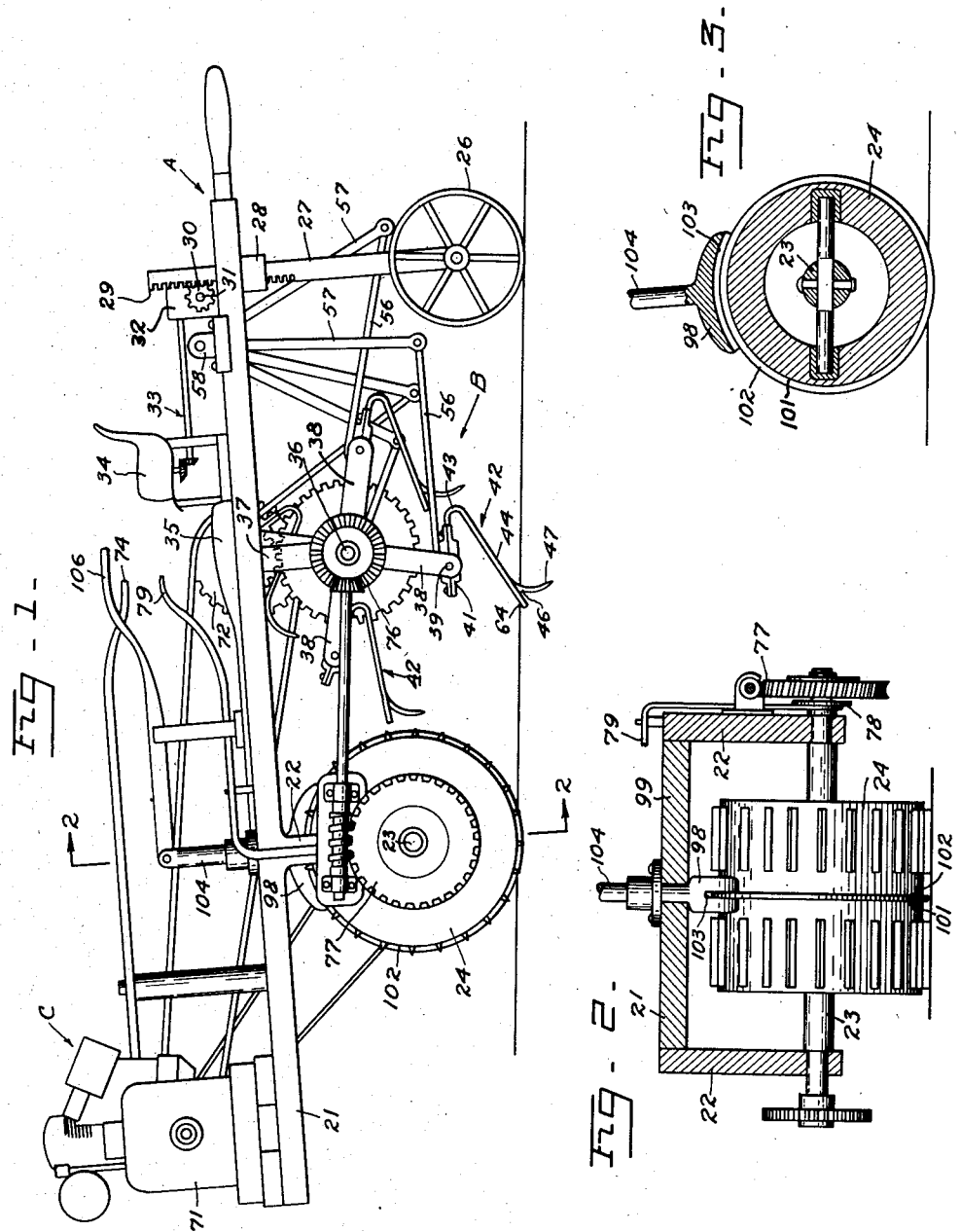

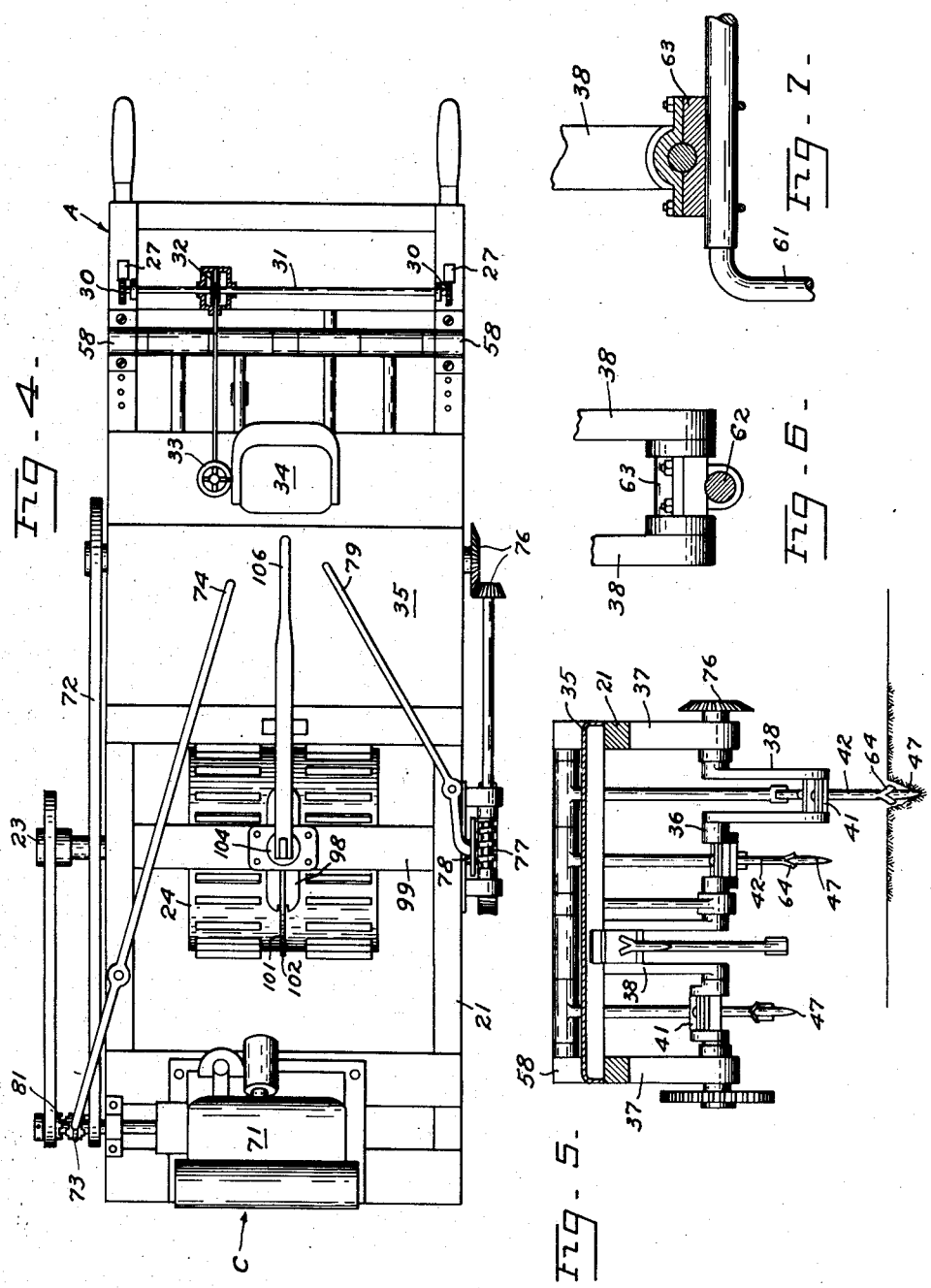

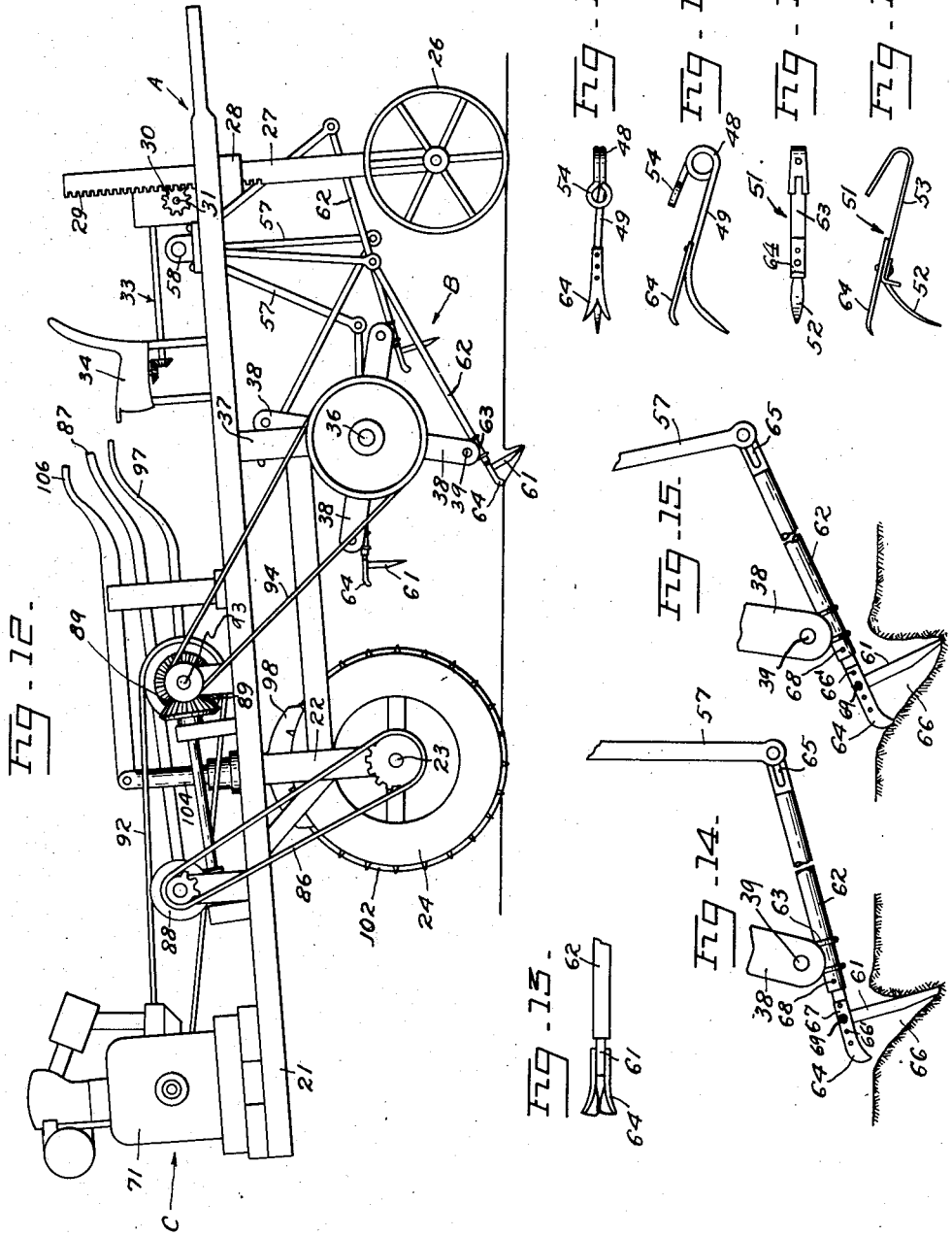

Patented June 6, 1939

2,161,428

UNITED STATES PATENT OFFICE 2,161,428

AGRICULTURAL DIGGING MACHINE

Caesar Pezzolo, San Francisco, Calif.

Application October 8, 1936, Serial No. 104,568

9 Claims. (Cl. 97—36)

This invention relates to agricultural digging machines.

An object of the invention is to provide a machine which is particularly adapted to be used for hoeing or digging rough, and thickly planted or fractionated ground rapidly, and practically without strain. The machine operates efficiently on grounds and in soil where the use of plough is difficult and sometimes impossible.

Another object of the invention is to provide an apparatus which is easily controlled by one person yet performs the soil cultivating work of three or more persons efficiently.

Another object of the invention is to provide an agricultural digging machine the cultivating blades of which are driven as the machine is advanced over the ground and are so moved into and out of the ground to loosen, break and tilt the ground yet be withdrawn without dragging or without resistance, means of connection being provided between the driving means and the digging mechanism to operate the same in synchronism and with such flexibility as to prevent breakage under any digging conditions.

Another object of this invention is to provide an agricultural digging machine which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Figure 1 is a side view of my apparatus.

Figure 2 is a fragmental front view of my apparatus.

Figure 3 is a side view of the traction wheel of my apparatus.

Figure 4 is a top plan view of my apparatus.

Figure 5 is a cross sectional view of my apparatus showing the blades and the crank support on the frame.

Figure 6 is a fragmental detail view of a modified support for the digging blades.

Figure 7 is a side view of said modified support.

Figure 8 is a top plan view of a modified form of my apparatus.

Figure 9 is a detail view of a resilient blade and its support at the beginning of the digging operation.

Figure 10 is a detail view of said blade at its lowest point in operation.

Figure 11 is a detail view of said blade as it is withdrawn from the ground.

Figure 12 is a side view of the modified embodiment of my apparatus.

Figure 13 is a fragmental plan view of a blade showing the spreader at its end.

Figure 14 is a side view of a modified blade and support.

Figure 15 is a side view of said modified blade at its lowest digging.

Figure 16 is a plan view of a resilient blade.

Figure 17 is a side view of said resilient blade.

Figure 18 is a plan view of a modified form of the blade.

Figure 19 is a side view of said modified form of the blade.

In its general organization the apparatus includes a supporting carriage A, on which are carried a digging or hoeing mechanism B, and a driving mechanism C, which latter drives both the digging mechanism B and the traction wheels of the apparatus.

The carriage A includes a frame 21 supported by bearing brackets 22 on the axle 23 of a traction wheel 24 spaced behind the front end of said frame 21, and on follower wheels 26 which latter are adjustably connected to the rear end of the frame 21 by telescoping bearing brackets 27. The upper ends of the brackets 27 are suitably secured in any adjusted position relatively to the frame, for instance by extending each bracket 27 through a sleeve 28 of said frame 21 and providing it with rack teeth 29 on one side of the respective brackets 27. Each pack 29 is engaged by a gear 30, both gears being suitably turned in either direction by a shaft 31 which latter is turned through a worm and gear transmission 32 by a geared hand wheel adjuster 33. The rear end of the frame 21 thus can be raised or lowered relatively to the ground for regulating the position of the blades above or in the ground.

The frame is held in such adjusted position by the self locking of the worm and gear transmission 32. Preferably on the top of the frame 21 at about the middle between said traction wheel 24 and the follower wheels 26 is a suitable seat 34 for the driver or operator. At the foot of the seat 34 a protective shield 35 is provided across the top of the frame 21 to protect the operator.

The digging or hoeing mechanism B includes a crankshaft 36 journaled in bearing brackets 37 extended downwardly from the frame 21 at about midway between the traction wheel 24 and the follower wheels 26. The crank arms 38 of the crank shaft 36 are staggered so that they successively reach their lowermost positions. On each crank 39 on the crank arms 38 is journaled a holder or clamp 41 made of two complemental sections fastened together. A portion of a blade 42 is firmly clamped between the sections of the holder 41. Each blade 42, when made as shown in Figures 1, 9, 10, and 11, is a preferably resilient blade bent substantially into an oblique forwardly extended Z shape. The blade near its clamped end is turned at 43 downwardly and forwardly relatively to the machine, viewing it in its lowered position, and continues in a straight portion 44 to its digging end which is turned at 46 downwardly and rearwardly and terminates in a strong digging or hoeing edge 47. The blade 42 is resilient at the turns 43 and 46, but especially at turn 43, so as to spring away slightly from the soil when unduly resisted thereby. The same applies in the form of blades illustrated in Figures 16 and 17 wherein the upper turn 48 of each blade 49 is made of looped or coiled wire, or the blade 51 illustrated in Figure 18, wherein the actual plow blade 52 is bolted to a bent spring 53. In the case of the blade 49 the clamped end of the blade 49 is formed into a loop or ring 54 to be suitably fastened in the holder 41.

To each holder 41 is pivoted an end of a link bar 56, preferably at a point rearward of the fulcrum or journal of the holder 41. Each link bar 56 extends rearwardly and is pivoted to a rocking arm 57 which latter extends upwardly and is swingably held in a fulcrum block 58. The mounting of the fulcrum block 58 on the frame 21 is adjustable longitudinally of the latter so as to locate the fulcrums of the rocking arms at a predetermined distance, nearer or farther from the crank shaft 36, thereby regulating the lifting of the blades 42 out of the ground at various depths. In effect therefore each blade 42 is controlled around a plurality of fulcrums, namely at the journal of the holder 41, then the fulcrum of the link bar 56 which turns the holder 41, and the fulcrum of the rocking arm 57 which controls the line of movement of the link bar 56. As a crank arm 38 passes over the lower center in counterclockwise direction viewing Fig. 1, the holder 41 is tilted in a clockwise direction so as to move the blade 42 in the direction of the traction movement so as to reduce dragging and resistance as the blade 42 is withdrawn from the soil after each digging operation. This also eliminates the complete overturning and throwing of the soil dug by the blades.

A modified form of the blade and its support is shown in Figures 12, 13, 14, and 15. In this embodiment a curved blade 61 is supported on a link bar 62 which latter is journalled at a point spaced from its free end by means of a bracket 63 on the crank 39. The other end of the link bar 62 is pivoted to a rocking arm 57 by a sliding pivot connection 65 so as to allow the blade 61 to give forwardly of the traction when withdrawn from the soil.

On the heel of the blade 61 as well as on the heel turn 46 of the type of blades heretofore described is provided a manure spreader element, in this illustration a flat spreader fork 64 which extends from the straight stem of the respective blades forwardly so that the end of the fork 64 reaches the surface of the soil ahead of the cut after the blade entered the soil and created a gap 66. As the blade is moved further into the ground the fork 64 penetrates the surface to a limited depth and sweeps manure or grass or the like from said surface into said gap 66. In this manner the fertilizer from the surface is thoroughly embedded in the soil in the same operation with the digging or hoeing without turning the soil completely over. The depth of penetration by said spreader fork 64 can be readily regulated by means of the adjustable mounting on the blade, which in the herein illustration consists a plurality of holes 66' in the stem 67 of said fork 64 which can be aligned with bolt holes 68 on the link bar 62 or on the blade stem 44 for securing bolts 69. The farther the fork 64 extends beyond the blade 42 or 61 the deeper it penetrates into the surface of the soil and the more substance it sweeps into the gap 66.

The driving mechanism C includes an engine 71 mounted on the forward end of the frame 21 so as to substantially balance the digging mechanism B. The engine 71 is connected both to digging mechanism B and the traction wheel 24 through suitable transmissions and clutches. In the embodiment shown in Figure 1 power may be transmitted to the traction wheel 24 selectively either through the digging mechanism B or directly. Power is transmitted from the engine 71 through a chain and sprocket transmission 72 to the crankshaft 36 so as to rotate the latter whenever a clutch 73 is shifted by means of a shaft lever 74 to the driving sprocket of the transmission 72. The crankshaft 36 is connected by gears 76 and by a worm and gear 77 to the traction axle 23, whenever a traction clutch 78 is shifted by a shift lever 79 into driving position. Thus whenever the resistance to digging increases or a blade is stopped by a stone or boulder the traction speed is correspondingly reduced or stopped, thereby preventing breakage. The forward advance of the entire apparatus is therefore automatically synchronized with the speed of or resistance to the digging operation and the strain on the crankshaft 36. On the other hand when the rear wheels 26 are adjusted to raise the blades 44 away from the ground and into inoperative position, then the clutch 78 is shifted into inoperative position rendering the traction independent from the crankshaft 36 and the clutch 73 can be shifted to a direct transmission 81 which latter is connected to the traction axle 23 to transmit power directly to the traction wheel 24 and permit the direct propelling of the machine independently of the digging mechanism.

In the embodiment shown in Figures 8 and 12 a selective clutch mechanism 83 transmits power to either of the transmissions 84 or 86 which latter are at the opposite ends of the traction axle 23 and are driving at different speed ratios.

The selective clutch mechanism 83 is shifted by a shaft lever 87 in the usual manner. The power is transmitted to the shaft of the clutch mechanism 83 by connected gearings 88 and 89 from a drive shaft 91 which latter is driven by a transmission 92 from the engine 71. The drive shaft 91 is preferably hollow and a crank drive shaft 93 is journaled therein, which latter is connected by a suitable transmission 94 to the crank shaft 36. The drive shaft 91 may be drivingly connected to the crank drive shaft 93 by another clutch 96 which is shifted by means of a shift lever 97. In this manner a selective drive both of the traction element and of the digging mechanism is readily achieved.

The steering of the machine is accomplished in the herein illustration by means of a steering yoke 98 vertically journaled in a cross member 99 of the frame 21. The yoke 98 is arcuate to fit over the top portion of a central groove 101 of the traction wheel 24. A ring 102 protrudes from said groove 101 and is slidably engaged with a slot 103 of said yoke 98. An upwardly extended shaft 104 of said yoke 98 is engaged by a rearwardly extended steering handle 106. When the handle 106 is turned laterally by the operator it turns the yoke 98 and the traction wheel 24 therewith.

Having described my invention, what I claim is:

1. In an agricultural digging machine having a plurality of cultivating blades, and means to move said blades into and out of the ground; a follower element on the blade trailing the blade in the same direction as the direction of the blade movements so as to sweep material from the surface of said grounds into the cut in the ground created by said blades.

2. In an agricultural digging machine the combination with a plurality of blades and means to move said blades on a substantially arcuate path into and out of the ground to be cultivated, of a follower element related to each blade and moving therewith to sweep material from the surface of the ground into the cut in the ground created by the blade.

3. In a cultivator machine of the character described, the combination with a rotating driving mechanism carrying blades so as to urge the blades into and out of the ground on a substantially arcuate path; of an extension on the follower side of each blade spaced from the cutting end of the blade and being disposed at such angle as to reach the surface of the ground after the blade penetrated into the soil and move material from the surface of the soil behind said blade into the cut created by the blade.

4. In a cultivator machine of the character described, the combination with a rotating driving mechanism carrying blades so as to urge the blades into and out of the ground on a substantially arcuate path; of an extension on the follower side of each blade spaced from the cutting end of the blade and being disposed at such angle as to reach the surface of the ground after the blade penetrated into the soil and move material from the surface of the soil behind said blade into the cut created by the blade, said extension being adjustable to penetrate the surface of the soil to a predetermined depth.

5. In a cultivator machine the combination with a frame having traction means, of a crankshaft on the frame, cultivating blades on the cranks of the crankshaft being moved into and out of the soil, means to drive said crankshaft, and means to transmit power from said crankshaft to said traction means.

6. In a cultivator machine the combination with a frame having traction means, of a crankshaft on the frame, cultivating blades on the cranks of the crankshaft being moved into and out of the soil, driving means, and means to connect said driving means to said traction means through said crankshaft.

7. In a cultivator machine the combination with a frame having traction means, of a crankshaft on the frame, cultivating blades on the cranks of the crankshaft being moved into and out of the soil, driving means, and means to selectively connect said driving means to said traction means either directly or through said crankshaft, said selective connecting means being adapted to disconnect said driving means from the crankshaft when the driving means is directly connected to said traction means.

8. In a cultivator machine of the character described, a traction wheel, an annular groove in the periphery of said traction wheel substantially intermediate between the ends of the wheel, an arcuate yoke on the frame on top of the wheel fitting into said groove, and a steering mechanism connected to said yoke whereby said yoke and said wheel are turned.

9. In a cultivating machine the combination with a frame having traction means, of a crank shaft on the frame, cultivating blades on the cranks of the crank shaft being moved into and out of the soil, driving means, and means for selectively transmitting power from the driving means to the traction means either directly or through said crank shaft.

CAESAR PEZZOLO.